(12) United States Patent
Salaun et al.

(10) Patent No.: US 7,041,626 B2
(45) Date of Patent: May 9, 2006

(54) LUBRICATING COMPOSITION FOR A SAFETY SUPPORT FOR A TIRE WHEN TRAVELING ON A FLAT TIRE

(75) Inventors: Georges Salaun, Nohanent (FR); Jean-Louis Mauclin, Pont du Chateau (FR)

(73) Assignee: Michelin Recherche et Technique S.A., (CH)

( * ) Notice: Subject to any disclaimer, the term of this patent is extended or adjusted under 35 U.S.C. 154(b) by 0 days.

(21) Appl. No.: 10/401,624

(22) Filed: Mar. 28, 2003

(65) Prior Publication Data

US 2003/0186822 A1    Oct. 2, 2003

Related U.S. Application Data

(60) Division of application No. 10/092,041, filed on Mar. 6, 2002, now Pat. No. 6,750,181, which is a continuation of application No. PCT/EP01/07703, filed on Jul. 5, 2001.

(30) Foreign Application Priority Data

Jul. 7, 2000  (FR) .................................. 00 08946

(51) Int. Cl.
- *C10M 169/02* (2006.01)
- *C10M 173/02* (2006.01)
- *B60C 17/01* (2006.01)

(52) U.S. Cl. ........................ 508/583; 152/521
(58) Field of Classification Search ............... 152/521; 508/583

See application file for complete search history.

(56) References Cited

U.S. PATENT DOCUMENTS

| | | | | |
|---|---|---|---|---|
| 3,739,829 A | | 6/1973 | Powell et al. ............... 152/330 |
| 3,850,217 A | * | 11/1974 | Edwards et al. ............. 152/503 |
| RE28,587 E | | 10/1975 | Powell et al. ................ 152/330 |
| 3,910,334 A | * | 10/1975 | Gardner ....................... 152/503 |
| 3,913,654 A | * | 10/1975 | French ......................... 152/521 |
| 3,946,783 A | * | 3/1976 | Edwards et al. ............. 152/503 |
| 4,036,765 A | * | 7/1977 | Conger et al. .............. 508/143 |
| 4,045,362 A | * | 8/1977 | Kuan et al. .................. 508/216 |
| 4,304,281 A | * | 12/1981 | Kenney ....................... 152/454 |
| 4,340,104 A | | 7/1982 | Kuan ........................... 152/521 |
| 4,371,024 A | * | 2/1983 | Stein et al. .................. 152/158 |
| 4,572,262 A | * | 2/1986 | Entmayr et al. ............. 152/501 |
| 5,796,041 A | | 8/1998 | Suzuki et al. ................. 174/92 |
| 5,836,366 A | | 11/1998 | Muhlhoff .................. 152/379.3 |
| 5,891,279 A | | 4/1999 | Lacour ......................... 152/520 |
| 6,096,349 A | * | 8/2000 | Petri et al. ................... 424/616 |

FOREIGN PATENT DOCUMENTS

FR        2397453         2/1979

\* cited by examiner

*Primary Examiner*—Jerry D. Johnson
(74) *Attorney, Agent, or Firm*—E. Martin Remick; Adam Arnold

(57) ABSTRACT

The present disclosure relates to a lubricating composition usable for lubricating an interface between a tire and a safety support mounted on a wheel rim within said tire, and a mounted assembly for an automobile provided with said lubricating composition. The lubricating composition according to the invention comprises an aqueous or non aqueous lubricating agent, and a polysaccharide intended to thicken said lubricating agent. The lubricating agent comprises glycerine in a mass fraction equal to or greater than about 60% of the lubricating agent and the lubricating agent is present in said composition in a mass fraction of between about 95% and 99%. The invention also relates to the lubrication between the support and the tire when traveling on a flat tire, following a drop in inflation pressure within said tire.

2 Claims, 7 Drawing Sheets

LUBRICATING COMPOSITION FOR A SAFETY SUPPORT FOR A TIRE WHEN TRAVELING ON A FLAT TIRE

CROSS REFERENCE TO RELATED APPLICATION(S)

The present application is a divisional application of U.S. application Ser. No. 10/092,041, filed Mar. 6, 2002, which is a continuation of International Patent Application No. PCT/EP01/07703, filed Jul. 5, 2001, which claims priority to French Application No. FR00/08946, filed Jul. 7, 2000.

BACKGROUND OF THE INVENTION

The present invention relates to a lubricating composition usable for lubricating an interface between a tire and a safety support mounted on a wheel rim within said tire, and a mounted assembly for an automobile provided with said lubricating composition. The invention relates to the lubrication between the support and the tire when traveling on a flat tire, following a drop in inflation pressure within said tire.

In order, when traveling at reduced or zero pressure of a tire, (referred to as traveling on a flat tire), to delay the deterioration due to heating of the zones of friction between various parts of the inner face of the tire, it has been attempted in the past to provide the inner face of the tire with a lubricating composition which is supposed to reduce the friction between these various parts of the tire.

These compositions are essentially composed of an aqueous lubricating agent, a thickening agent intended to increase the viscosity of the lubricating agent so as to minimize the flowing of said lubricating agent due to the weight when the vehicle is at rest or is traveling with its tires inflated, and a surfactant.

French patent specification FR-A-2 100 803 mentions such lubricating compositions for tire/tire lubrication. Each of the lubricating agents described in this document comprises water in a majority proportion and, in a minority proportion, a compound for lubrication such as a silicone oil, ethylene glycol or glycerine. In the example of embodiment mentioning glycerine, the latter is present in the lubricating agent and in the lubricating composition in volume fractions of approximately 30%, compared with 70% for water. Hydroxy-ethylcellulose is mentioned as thickening agent.

It will be noted that this high volume of water is intended, on one hand, to reinflate by volatilization the tire when traveling on a flat tire and to reduce to a certain extent the stresses of which the sidewalls of the tire are the seat, and, on the other hand, to optimize the foaming effect of the surfactant used when traveling on a flat tire.

French patent specification FR-A-2 397 453 and Japanese patent specification JP-B-83/30 000 also mention a lubricating composition for tire/tire lubrication which is intended to reduce the friction between the upper and lower parts of deflated sidewalls. The lubricating agent of the composition applied to the sidewalls of the tire comprises water in a majority proportion and ethylene glycol in a minority proportion, as in document FR-A-2 100 803. The lubricating composition comprises, as thickening agent, a polyethylene oxide and a polysaccharide, and it furthermore comprises a fibrous filler of cellulose type.

More recently, attempts have been made to improve the endurance of mounted assemblies, under conditions of travel at reduced or zero inflation pressure, by providing a safety support which is mounted on the wheel rim so as to be able to support the tread of the tire in the event of a drop in the inflation pressure. Mention may be made of French patent specification FR-A-2 746 347 for the description of such a support.

In this context, support/tire lubricating compositions were tested which are specifically intended to reduce the friction between said support and the inner face of the tire surrounding the support, these compositions conventionally being applied to the inner face of the tire, prior to the mounting thereof on the rim, and under conditions of travel on a flat tire and of load which are more severe and over periods which are distinctly superior to those relating to the prior tests without safety support.

As lubricating composition for support/tire lubrication, mention may be made for example of a composition the lubricating agent of which is based on polyalkene glycols and ethoxylated nonylphenol, and a thickening agent.

Such a composition imparts satisfactory endurance when traveling on a flat tire to the mounted assemblies incorporating it. However, one major disadvantage of this composition lies in the presence of the ethoxylated nonylphenol, which is a product that irritates the skin and eyes.

SUMMARY OF THE INVENTION

The present invention relates to a lubricating composition usable for lubricating an interface between a tire and a safety support mounted on a wheel rim within said tire, and a mounted assembly for an automobile provided with said lubricating composition.

The lubricating composition according to the invention comprises a lubricating agent, whether aqueous or not, and a polysaccharide intended to thicken said lubricating agent, wherein said lubricating agent comprises glycerine in a mass fraction equal to or greater than about 60% of the lubricating agent, said lubricating agent being present in said lubricating composition in a mass fraction of between about 95% and 99%. The composition of the invention makes possible to both prevent flowing of the composition prior to traveling on a flat tire and ensure lubrication when traveling on a flat tire, which is improved compared to known lubricating compositions. Moreover, the composition is not awkward to handle.

The invention also relates to the lubrication used between the support and the tire when traveling on a flat tire, following a drop in inflation pressure within said tire.

BRIEF DESCRIPTION OF THE DRAWINGS

The aforementioned characteristics of the present invention, as well as others, will be better understood on reading the following description of several examples of embodiment of the invention, which are given by way of illustration and not of limitation, said description being given in relation to the appended drawings.

DETAILED DESCRIPTION OF THE INVENTION

Figure 1:
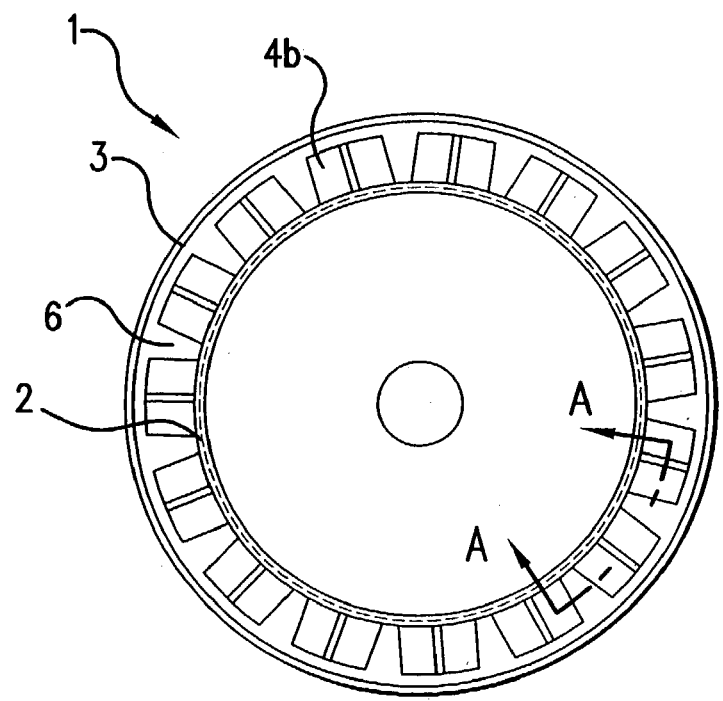
FIG. 1 is a side view of a safety support intended to be included in a mounted assembly according to the invention.

The inventors have surprisingly discovered that the use of a lubricating agent comprising glycerine in a mass fraction equal to or greater than about 60% of the agent, in a lubricating composition usable for lubricating an interface between a tire and a safety support mounted on a wheel rim within said tire, said composition comprising essentially, on one hand, this lubricating agent, whether aqueous or not, and, on the other hand, a polysaccharide intended to thicken said lubricating agent, such that said lubricating agent is present in said lubricating composition in a mass fraction of between about 95% and 99%, makes it possible to both prevent flowing of the lubricating composition prior to traveling on a flat tire and to ensure lubrication when traveling on a flat tire which is improved compared with known lubricating compositions, without this composition being awkward to handle.

According to a preferred example of embodiment of the invention, the glycerine is present in said lubricating agent in a mass fraction equal to or greater than about 70%, which also contains water in a mass fraction less than or equal to about 30%.

According to another characteristic of the invention, said polysaccharide is present in said composition in a mass fraction of between about 1% and 2%.

Preferably, said polysaccharide is present in said composition in a mass fraction of between about 1.5% and 1.8%.

It will be noted that this specific range of mass fraction for said polysaccharide makes it possible, unexpectedly and even more advantageously, to prevent flowing of the composition, prior to travel on a flat tire, and to preserve the lubrication when traveling on a flat tire.

According to another characteristic of the invention, this lubricating composition has a viscosity at 25° C. and at atmospheric pressure, measured in accordance with the "Brookfield" technique by means of a spindle designated "LV4", which is of between 100,000 centipoise and 160,000 centipoise.

The polysaccharide used as thickening agent makes it possible to impart a thixotropic nature to the lubricating composition according to the invention.

According to one example of embodiment of the invention, said polysaccharide is a xanthan gum.

According to one embodiment of the invention, the lubricating composition comprises at least one surfactant which is present in said composition in a mass fraction less than or equal to about 0.2%.

This surfactant makes it possible to impart to the lubricating composition sufficient wettability on the inner face of the tire, and it is for example formed of an alkali metal salt of an alkyl aryl sulphonic acid.

It will be noted that a lubricating composition according to the invention may furthermore comprise various additives, such as colorants, bactericides or preservation agents.

(the mass fraction of each constituent in the composition is given in %).

| | | |
|---|---|---|
| *Lublicating agent: | Glycerine | 88.6%. |
| | Water | 9.8%. |
| *Thickening agent: | Polysaccharide (xanthan gum) | 1.5%. |
| *Surfactant: | Sodium alkyl aryl sulphonate | 0.1%. |

The thickening agent used is sold by RHODIA under the name "RHODOPOL 23", and it is mixed in the powdered state with the other constituents of this lubricating composition. The mixing is carried out at ambient temperature, owing to the fact that this thickening agent is soluble in water.

In the case of using a non-aqueous lubricating agent for the lubricating composition according to the invention (that is to say, a lubricating agent consisting of pure glycerine), it will be noted that this thickening agent must be mixed "in the hot state" with the other non-aqueous constituents, in order to dissolve it in glycerine. More precisely, the mixture must be stirred for approximately 15 min. at a temperature close to 70° C.

The surfactant used is sold by SIDOBRE SINNOVA under the name "SINNOZAN NS 30".

Furthermore, this composition has a viscosity of 140,000 centipoise (measured by the "BROOKFIELD" technique by means of a "LV4" spindle rotating at a speed of 3 rpm).

A lubricating composition according to a second example of embodiment of the invention contains the same constituents as the first composition mentioned above, but its formulation is as follows:

(the mass fraction of each constituent in the composition is given in %).

| | | |
|---|---|---|
| *Lubricating agent | Glycerine | 78.5%. |
| | Water | 19.6%. |
| *Thickening agent: | Polysaccharide (xanthan gum) | 1.8%. |
| *Surfactant: | Sodium alkyl aryl sulphonate | 0.1%. |

Furthermore, this composition has a viscosity of 110,000 centipoise (measured by the "BROOKFIELD" technique and the aforementioned apparatus).

A lubricating composition which is not in accordance with the present invention has the following formulation:

(the mass fraction of each constituent in the composition is given in %).

| *Lubricating agent: | Ethylene glycol | 87.6%. |
| --- | --- | --- |
| | Water | 9.8%. |
| *Thickening agent: | Polysaccharide (xanthan gum) | 2.5%. |
| *Surfactant: | Sodium alkyl aryl sulphonate | 0.1%. |

The thickening agent and the surfactant of this composition are the same as those mentioned above.

Furthermore, this latter composition which is not in accordance with the invention has a viscosity of 110,000 centipoise (measured as previously).

Three identical tires (of dimensions 205-650 R 440) were provided with 60 g of said first composition according to the invention, 60 g of said second composition according to the invention and 60 g of said composition which is not in accordance with the invention, respectively. More precisely, each of the three lubricating compositions was applied to a median zone of the inner face of the corresponding tire, which zone has substantially as its plane of symmetry the equatorial plane of the tire.

Then these three tires, respectively provided with the aforementioned lubricating compositions were mounted on identical rims, each having the same elastomeric safety support mounted on the rim beforehand.

More precisely, the characteristic dimensions of each mounted assembly thus obtained, intended for fitting on an automobile sold under the name "PEUGEOT 806" are, in mm, 205-650-440 (respectively width of tire-diameter of tire-diameter of rim).

Figure 2:
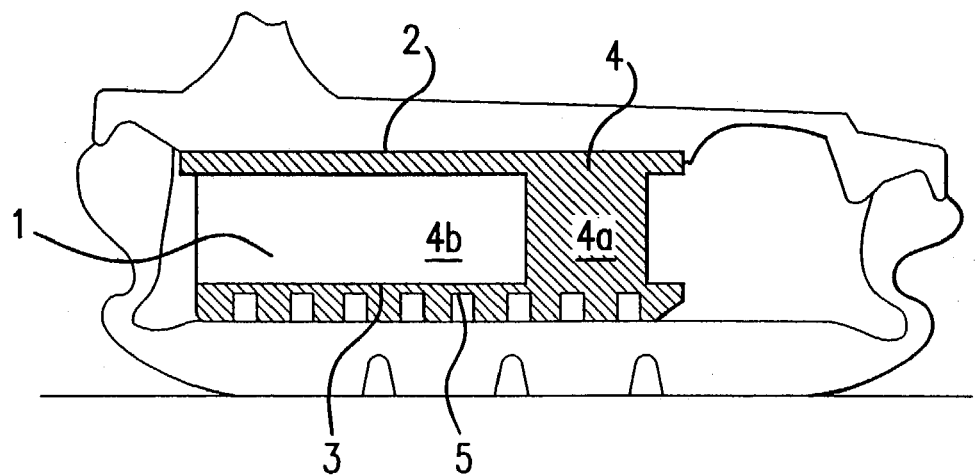
FIG. 2 is a view in axial section of a mounted assembly according to the invention, in which the support of FIG. 1 is mounted on a wheel rim and is in the position of bearing against a tire.

For each rim, a rim such as the one shown in FIG. 2 was used (this rim is also described in detail in French patent specification FR-A-2 720 977).

With reference to FIGS. 1 and 2, each of the supports 1 tested comprises essentially three parts:
 a base 2, of generally annular shape;
 a substantially annular crown 3, with (optionally) longitudinal grooves 5 on its radially outer wall, and
 an annular body 4 for connecting the base 2 and the crown 3.

FIG. 2 illustrates in particular the function of support 1, which is to support the tread of the tire in the event of a serious loss of inflation pressure therefrom.

The section of FIG. 2 shows a first, solid, part 4a of the annular body 4 and also a second part 4b formed of cutouts (see also FIG. 1) extending axially over substantially more than half of the annular body 4, opening on to the outside in a substantially axial direction. These cutouts 4b are distributed regularly over the entire circumference of the annular body 4 and they define partitions 6, which ensure direct radial connection between the crown 2 and the base 3 of the support 1.

This geometry has the advantage of flexurally stressing, not compressively stressing, these partitions 6 when they are loaded. The cutouts 4b and therefore the partitions 6 are sufficiently numerous to provide regular support during supported travel.

The characteristic dimensions in mm of each support 1 (respectively width-internal diameter-height) are: 135-440-50.

More precisely, each support 1 comprises, over its circumference, 38 partitions 6 which each have a thickness of 18 mm, and which are spaced apart two by two by 38 mm. Furthermore, the base 2 and crown 3 have thicknesses which are equal to 6 mm and to 7 mm respectively. As for the annular body 4 of each support 1, it has a width (in the axial direction) equal to 35 mm. The weight of each support 1 is 5.7 kg.

Each support 1 comprises an elastomeric matrix based on natural rubber and a reinforcing filler based on highly dispersible silica.

Then three successive tests traveling on a flat tire were performed on a "PEUGEOT 806" vehicle, the right-hand front wheel of which is provided for each test with a support such as the one mentioned above, and a tire coated with one of the three lubricating compositions to be tested.

The conditions of traveling on a flat tire were as follows for each of these tests:

| load on the wheel: | 530 kg; |
| --- | --- |
| average speed of travel: | 80 km/h; |
| maximum distance traveled: | 405 km; |
| ambient temperature for travel: | between 12° C. and 17° C. |
| travel on a circuit of motorway type. | |

Figure 3:
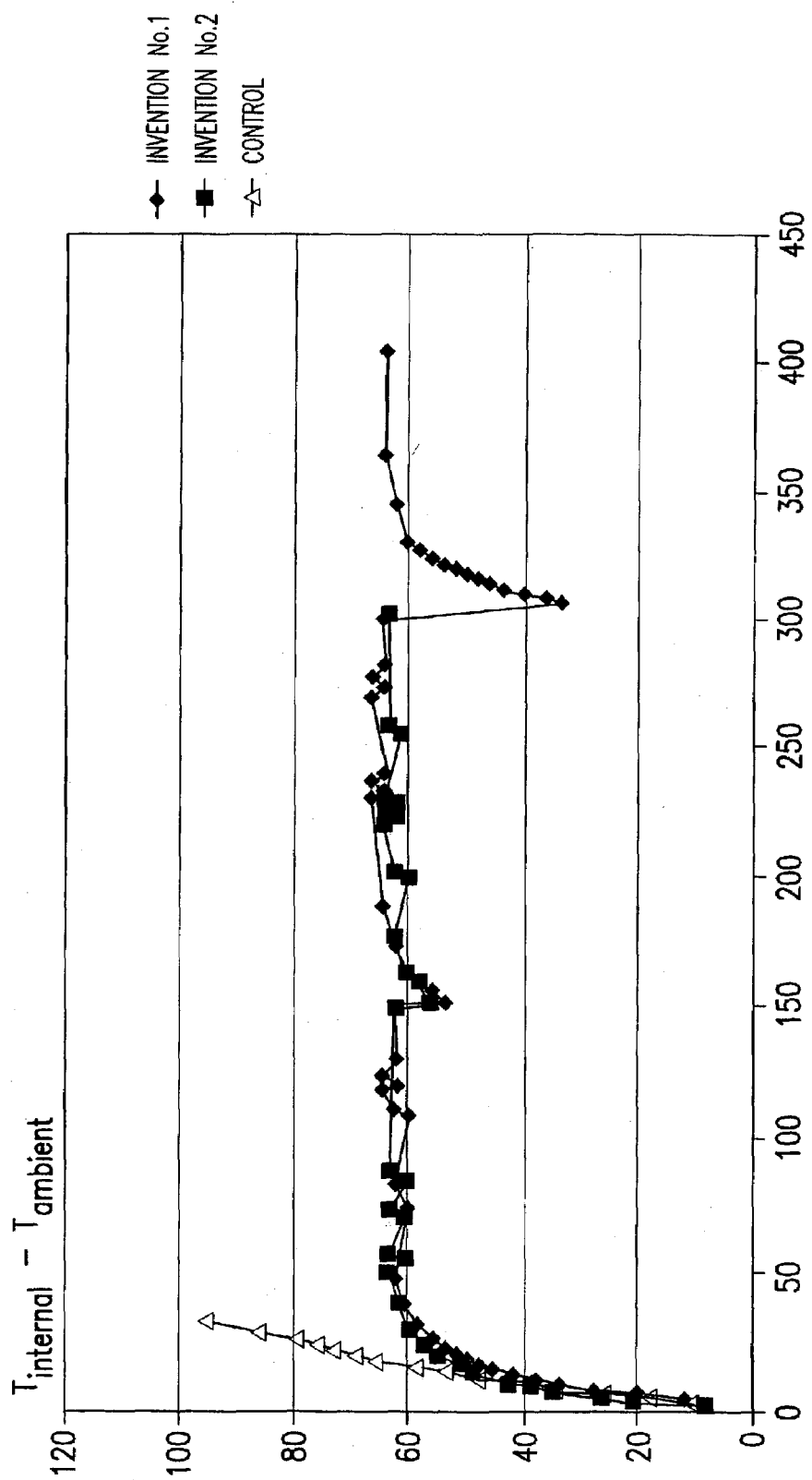
FIG. 3 is a graph illustrating the evolution of the internal heating, when traveling on a flat tire, of two mounted assemblies provided respectively with two lubricating compositions according to the invention, in comparison with a mounted assembly provided with a lubricating composition which is not in accordance with the invention.

FIG. 3 shows the evolution, as a function of the mileage traveled, of the difference in temperature between the internal temperature within the front right-hand tire, which from the origin (0 kilometers) travels at zero internal pressure, and the ambient temperature or external temperature.

It will be noted that the vehicle made two stops at 150 and 300 kilometers for each of the three tests carried out, which results in a drop in the difference ($T_{internal}-T_{ambient}$) at these two distances traveled.

It emerges from FIG. 3 that after traveling for 10 km on a flat tire, the mounted assemblies in accordance with the first and second example of the invention ("invention No. 1" and "invention No. 2" respectively in FIG. 3) each have an internal heating which increases moderately, in comparison with that of the mounted assembly which is not in accordance with the invention, which heats up very rapidly to reach, after only 30 km, an internal temperature of approximately 110° C.(aforementioned difference of 96° C.), which necessitates stopping travel.

In fact, analysis after 30 km travel of this mounted assembly which is not in accordance with the invention made it possible to demonstrate, within the tire, the undesirable formation of rubber crumbs, the beginning of destruction of the support and almost total disappearance of the lubricating composition based on ethylene glycol which was initially present, hence the high level of heating observed.

After these 30 km traveled, the two compositions according to the invention on the other hand have a substantially constant value of approximately 62° C. for said difference, until the end of travel (405 km and 300 km approximately for the mounted assemblies in accordance with the first and second examples of the invention, respectively).

In other words, the lubricating compositions based on glycerine according to the invention make it possible to impart to the corresponding mounted assemblies a lubrication and, consequently, an endurance when traveling on a flat tire which are very distinctly improved compared with those imparted by the presence of a different lubricating agent based on ethylene glycol.

It will furthermore be noted that the mass fraction of thickening agent (xanthan gum) in the lubricating composition, which is 1.5% and 1.8% in the first and second examples according to the invention, makes it possible not only to obtain satisfactory lubrication when traveling on a flat tire, but also to avoid flowing of the lubricating composition prior to this running on a flat tire (be it when the vehicle is at rest or when the mounted assembly provided with this composition is traveling in the inflated state).

An attempt was then made to compare the degree of volatilization as a function of the temperature of glycerine, relative to that of ethylene glycol.

Figure 4:
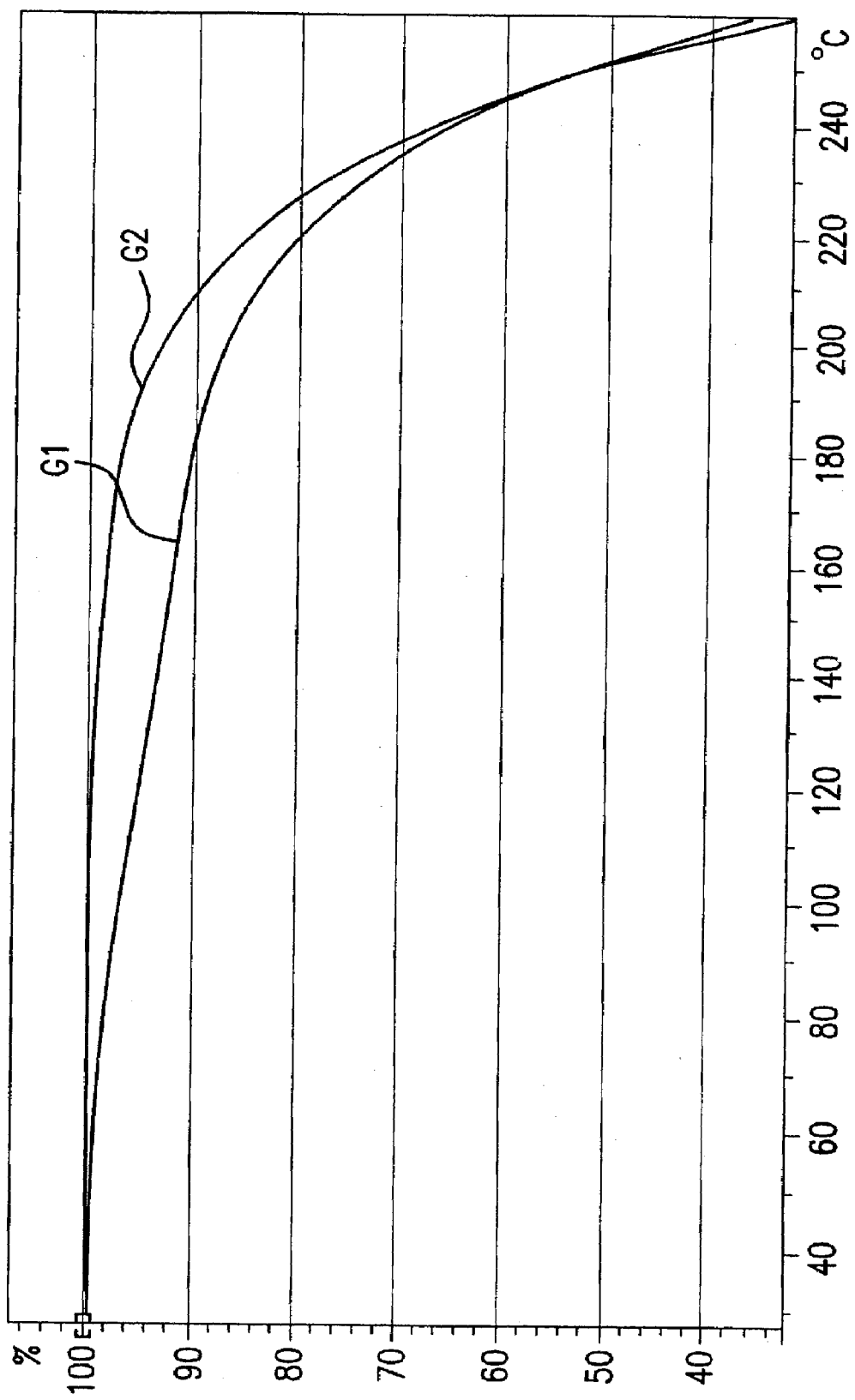
FIG. 4 is a graph illustrating the degree of volatilization as a function of the temperature of lubricating agents according to the invention.

FIG. 4 shows the evolution of the ratio (mass of glycerine at the temperature T of heating the glycerine/mass of glycerine at an initial ambient temperature of approximately 25° C.) as a function of said heating temperature T (varying substantially from 25° C. to 250° C.), for:

what is called "technical-grade" glycerine (curve "G1" in FIG. 4), that is to say comprising glycerine in a mass fraction of 90% and water in a mass fraction of 10%, said "technical-grade" glycerine having an initial mass of 32.74 mg at ambient temperature, and for pure glycerine (curve "G2" in FIG. 4), which has an initial mass of 40.15 mg at ambient temperature.

Figure 5:
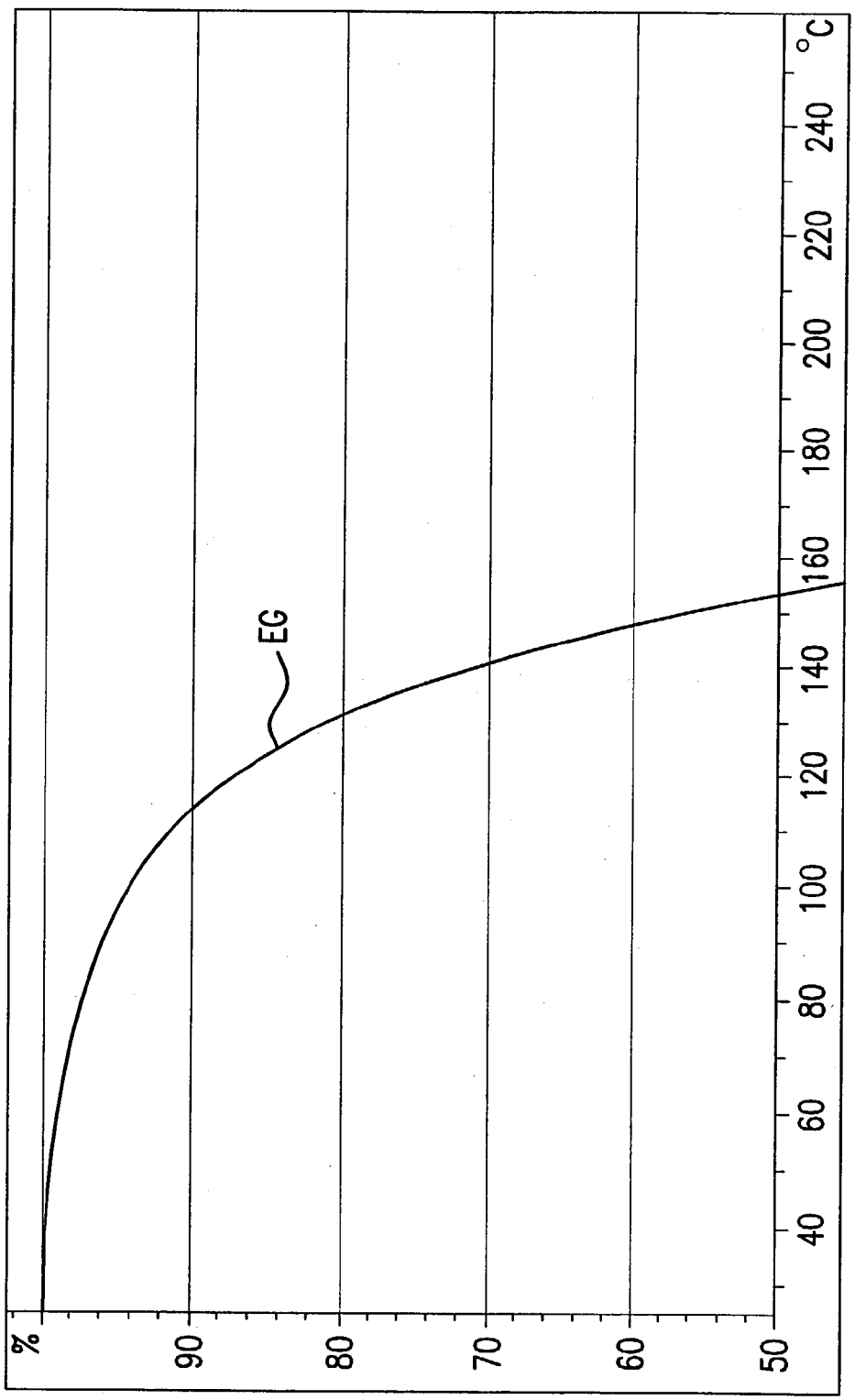
FIG. 5 is a graph illustrating the degree of volatilization as a function of the temperature of a lubricating agent which is not in accordance with the invention.

FIG. 5 shows in the same manner the evolution of the ratio (mass of ethylene glycol at the temperature T/mass of ethylene glycol at an ambient temperature of approximately 25° C.) as a function of the temperature T (varying substantially from 25° C. to 250° C.), for pure ethylene glycol having an initial mass of 13.79 mg at ambient temperature.

An immobile boat intended to contain the products to be heated, and a "METTLER TOLEDO" thermal analysis apparatus were used for these measurements.

It will be deduced from these FIGS. 4 and 5 that half of the initial mass of glycerine ("technical-grade" or pure) disappeared only at a very high temperature, of the order of 250° C., whereas half of the initial mass of ethylene glycol had already disappeared at a temperature close to only 150° C.

Furthermore, comparative running tests were carried out on a roller, with the aim of studying the effect of thermal ageing on the endurance when traveling on a flat tire of two tires respectively provided with a lubricating composition in accordance with said first example of the invention and a known lubricating composition.

The latter comprises a lubricating agent, which is present in the form of a majority fraction soluble in carbon tetrachloride and which is based on polyalkene glycols and ethoxylated nonylphenol, and it also comprises a thickening agent, which is present in the form of a minority fraction insoluble in carbon tetrachloride and which comprises calcium ions and stearate.

Thermal aging was effected in an oven heated to 55° C. for 2 months and, for various masses of each lubricating composition which was applied to the inner face of a tire, the distance of travel on a flat tire was evaluated by stopping travel for an increase in the deflection of 1.5 m.

The roller had a diameter of 1.59 m, and the conditions of travel were as follows:
load of 530 kg;
speed of 75 km/h;
ambient temperature: 20° C.

Figure 6:
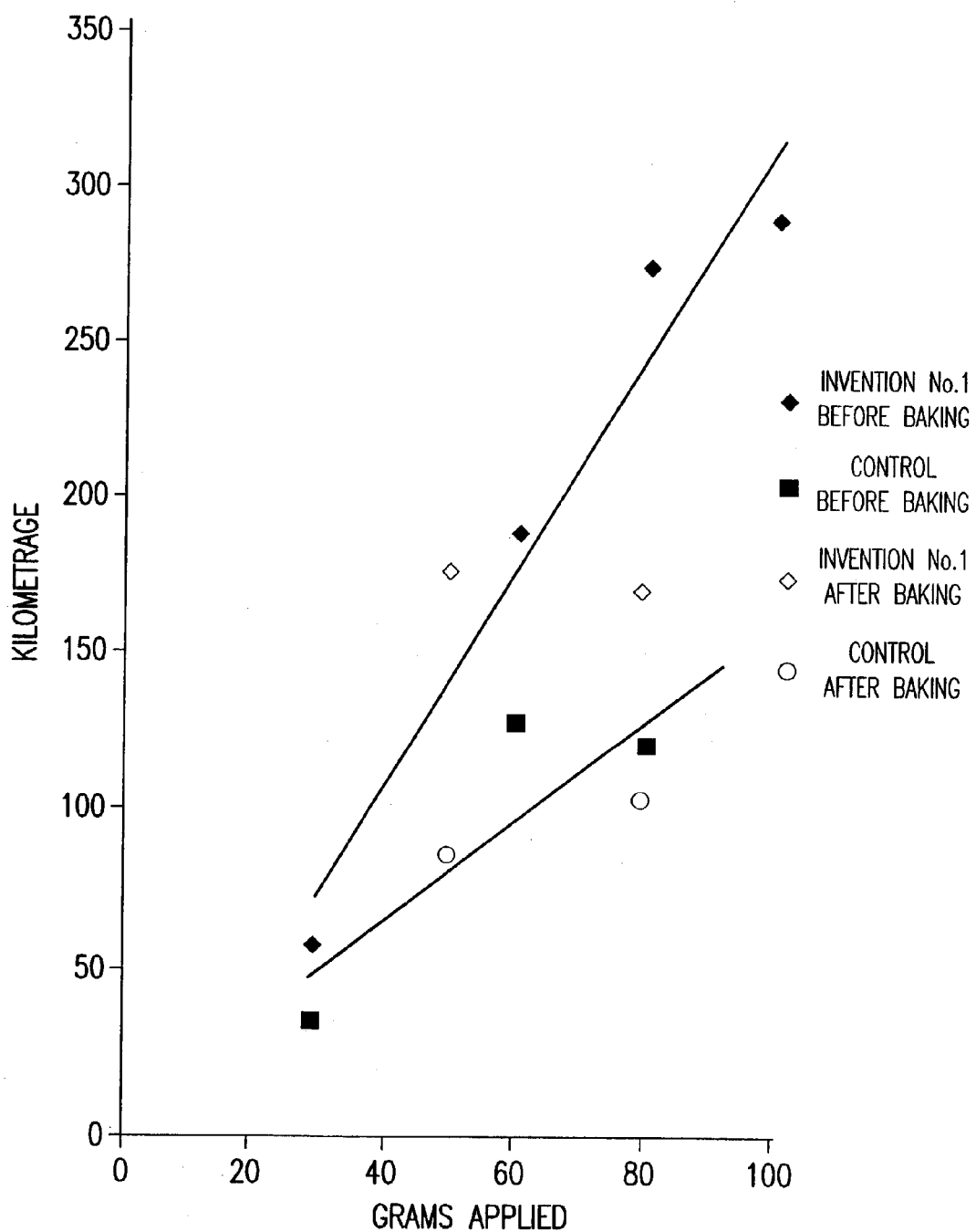
FIG. 6 is a graph illustrating the effect of thermal ageing on the endurance, when traveling on a flat tire, of two tires respectively provided with a lubricating composition in accordance with an example of the invention and a known lubricating composition.

FIG. 6 shows the results obtained for the composition according to the first example of the invention ("invention No. 1", before and after baking) and for said known composition ("control", before and after baking).

This FIG. 6 shows that after thermal aging, the endurance of a tire provided with a lubricating composition in accordance with the first example of the invention (based on glycerine) is always greater than that of a tire provided with a known lubricating composition based on polyalkene glycols, for the same mass of lubricating composition applied varying from 30 g to 100 g approximately.

Furthermore, other running tests on a flat tire were carried out under conditions similar to those mentioned above in relation to FIG. 3, but at temperatures of the ambient air which are very much lower than those characterizing the tests of this FIG. 3. The results of these new low-temperature tests are illustrated in FIGS. 7 and 8.

To this end, the same "PEUGEOT 806" vehicle was used, the front right-hand wheel of which is provided with a support such as the one mentioned above, and with a tire coated with a lubricating composition to be tested, and the evolution, as a function of the mileage covered, of the temperature difference between the internal temperature of the front right-hand tire, which has run at zero internal pressure from the outset, and the ambient temperature is measured.

Figure 7:
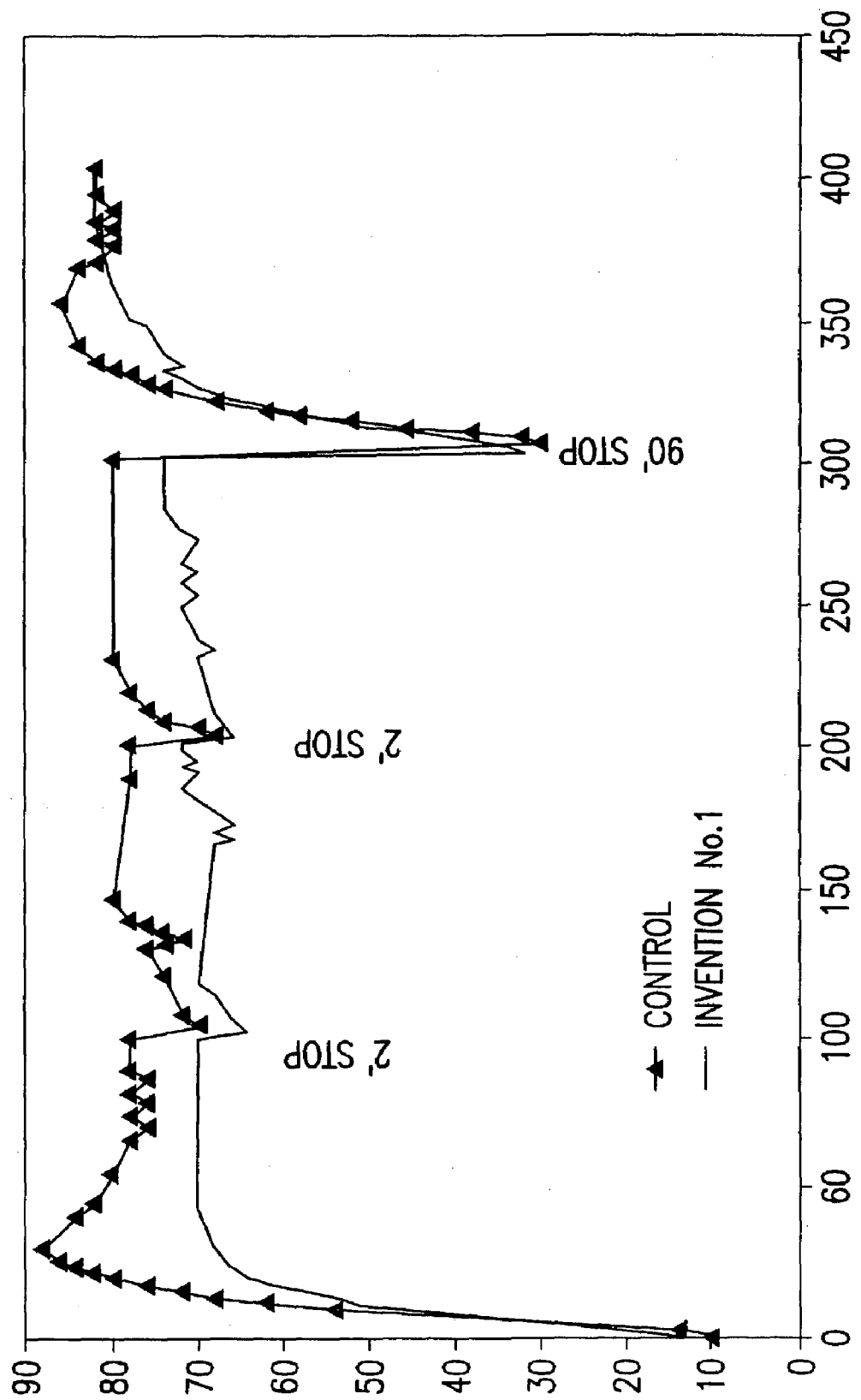
FIG. 7 is a graph illustrating the evolution of the internal heating, when traveling on a flat tire, of two mounted assemblies provided respectively with a lubricating composition according to the invention and said known lubricating composition.
Figure 8:
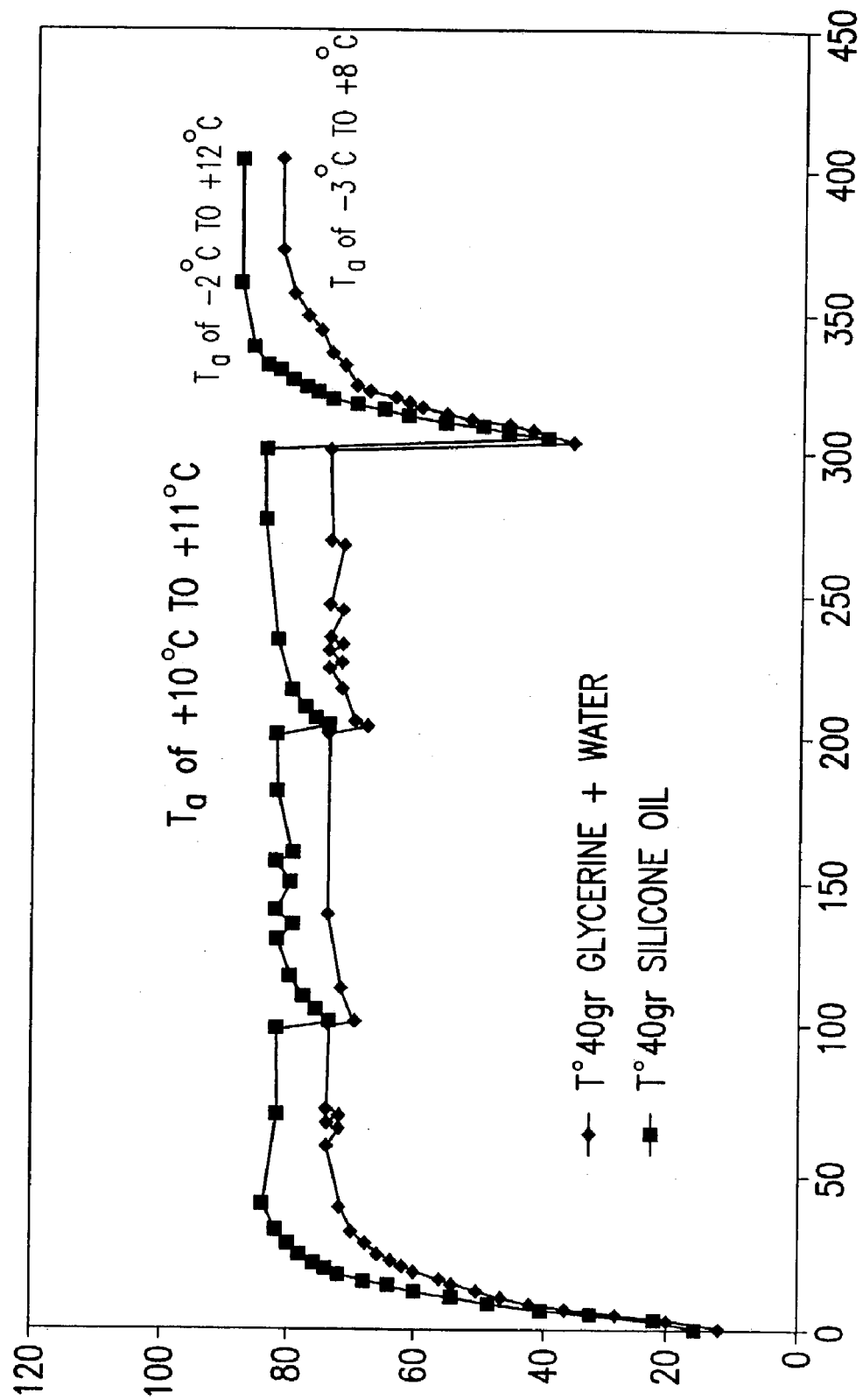
FIG. 8 is a graph illustrating the evolution of the internal heating, when traveling on a flat tire, of two mounted assemblies provided respectively with a lubricating agent included in a lubricating composition according to the invention and a lubricating agent which is not in accordance with the invention.

The conditions of traveling on a flat tire were as follows for each of these tests:

| | |
|---|---|
| load on the wheel: | 530 kg; |
| average speed of travel: | 80 km/h; |
| maximum distance traveled: | 405 km; |
| ambient temperature for travel: | from −2° C. to 5° C. for the tests | illustrated in FIG. 7, and from 10° C. to 11° C. for the tests illustrated in FIG. 8;

travel on a circuit of motorway type.

It will be noted that the vehicle, for each of the tests carried out, made three stops at 100, 200 and 300 kilometers (respectively 2 min., 2 min. [sic] and 1 h 30 min.), which results in a drop in the difference ($T_{internal} - T_{ambient}$) at each of these distances traveled.

In a first series of tests at low temperature (FIG. 7), there were respectively applied to two tires 60 g of the composition according to the first example of the invention (based on glycerine in a mass fraction of 88.6%) and 60 g of said known composition based on polyalkene glycols.

It emerges from FIG. 7 that after approximately 20 km traveling on a flat tire, the mounted assembly in accordance with the first example of the invention ("invention No. 1" in FIG. 7) has internal heating which increases more slowly than that of the known mounted assembly ("control" in FIG. 7), which heats up very rapidly to reach only an internal temperature close to 90° C. after 30 km.

It will be noted that the internal temperature of the mounted assembly in accordance with the first example of the invention remains always less than that of this known mounted assembly, during the 300 km of travel on a flat tire.

In other words, the lubricating composition according to the invention makes it possible to impart to the corresponding mounted assembly a lubrication and, consequently, an endurance when traveling on a flat tire which are improved compared with those imparted by the presence of a known lubricating agent based on polyalkene glycols.

In a second series of tests at low temperature (FIG. 8), there were respectively applied to two tires 40 g of the lubricating agent of the composition according to the first example of the invention (consisting of 90% glycerine and 10% water, in mass fractions) and 40 g of a lubricating agent which is not in accordance with the invention based on silicone oil, in order to compare the corresponding heating when traveling on a flat tire.

This lubricating agent based on silicone oil is sold under the name "SILICONE FLUIDE 47V300" by RHODIA, and it has a viscosity of 350 centistokes at 25° C.

It emerges from FIG. 8 that after approximately 20 km traveling on a flat tire, the mounted assembly in accordance with the first example of the invention ("glycerine+water" in FIG. 8) has internal heating which increases more slowly than that of the mounted assembly provided with silicone oil, which heats up very rapidly to reach only an internal temperature close to 80° C. after 30 km.

As previously, it will be noted that the internal temperature of the mounted assembly in accordance with the first example of the invention remains always less than that of this mounted assembly provided with silicone oil, during the 300 km of travel on a flat tire.

In other words, the lubricating agent according to the invention makes it possible to impart to the corresponding mounted assembly a lubrication and, consequently, an endurance when traveling on a flat tire which are improved compared with those imparted by the presence of a lubricating agent which is not in accordance with the invention, based on silicone oil.

It will be noted that the polysaccharide of xanthan gum type which is advantageously used in the lubricating compositions according to the invention imparts satisfactory thickening properties to the specific lubricating agent of the invention, which is based on glycerine.

It will also be noted that in the case of using a non-aqueous lubricating agent (i.e., pure glycerine) in the lubricating composition of the invention, the mass fraction of thickening agent in this composition could vary within a range of mass fraction which is wider than the aforementioned range of from 1% to 2%, while preventing flowing of the composition before traveling on a flat tire and while preserving the lubrication when traveling on a flat tire.

It will furthermore be noted that the lubricating compositions according to the invention are soluble in water, which makes it possible to effect washing of the rim or the tire of a mounted assembly provided with such a composition, in the event of soiling of the rim, the outer face of the tire or alternatively in order to effect a repair.

We claim:

1. A mounted assembly for an automobile comprising a rim, a safety support which is mounted on said rim, wherein at least the radially outer face of said safety support is formed of an elastomeric or plastic material, and a tire mounted on said rim around said support, said rim having on each side of its two peripheral edges a rim seat on which is mounted a bead of said tire, said rim comprising between its two seats a bearing surface receiving said support, wherein said mounted assembly is provided with a thixotropic lubricating composition comprising (a) a lubricating agent, wherein said lubricating agent is aqueous or nonaqueous and (b) a polysaccharide which thickens said lubricating agent, wherein said lubricating agent comprises glycerine in a mass fraction equal to or greater than about 60% of the lubricating agent, said lubricating agent being present in said composition in a mass fraction of between 95% and 99%, and wherein said polysaccharide is present in said composition in a mass fraction of between about 1% and 2%.

2. The mounted assembly according to claim 1, wherein said mounted assembly is provided with a lubricating composition on the inner face of said tire.

* * * * *